(12) United States Patent
Lee

(10) Patent No.: US 9,090,142 B2
(45) Date of Patent: Jul. 28, 2015

(54) DEVICE FOR DRIVING REAR WHEEL OF ELECTRIC VEHICLE

(71) Applicant: HYUNDAI WIA CORPORATION, Gyeongsangnam-do (KR)

(72) Inventor: Sang Min Lee, Gyeonggi-do (KR)

(73) Assignee: HYUNDAI WIA CORPORATION, Gyeongsangnam-do (KR)

( * ) Notice: Subject to any disclaimer, the term of this patent is extended or adjusted under 35 U.S.C. 154(b) by 0 days.

(21) Appl. No.: 14/141,097

(22) Filed: Dec. 26, 2013

(65) Prior Publication Data

US 2014/0374178 A1 Dec. 25, 2014

(30) Foreign Application Priority Data

Jun. 25, 2013 (KR) .................. 10-2013-0073299

(51) Int. Cl.
  *B60K 1/00* (2006.01)
  *B60G 21/05* (2006.01)
  *B60K 7/00* (2006.01)
  *B60K 17/04* (2006.01)

(52) U.S. Cl.
  CPC ............ *B60G 21/051* (2013.01); *B60K 7/0007* (2013.01); *B60K 17/043* (2013.01); *B60K 2007/0038* (2013.01); *B60K 2007/0061* (2013.01); *B60Y 2400/3032* (2013.01)

(58) Field of Classification Search
  CPC ..................... B60K 7/0007; B60K 2007/0038; B60K 2007/0061
  USPC .............................................. 180/65.51, 65.6
  See application file for complete search history.

(56) References Cited

U.S. PATENT DOCUMENTS

| 4,799,564 | A | * | 1/1989 | Iijima et al. ................. 180/65.51 |
| 4,930,590 | A | * | 6/1990 | Love et al. ....................... 180/55 |
| 5,014,800 | A | * | 5/1991 | Kawamoto et al. ......... 180/65.51 |
| 5,087,229 | A | * | 2/1992 | Hewko et al. .................. 475/149 |
| 5,127,485 | A | * | 7/1992 | Wakuta et al. .............. 180/65.51 |
| 5,150,763 | A | * | 9/1992 | Yamashita et al. ............ 180/252 |
| 5,156,579 | A | * | 10/1992 | Wakuta et al. ................ 475/161 |
| 5,163,528 | A | * | 11/1992 | Kawamoto et al. ......... 180/65.51 |
| 5,180,180 | A | * | 1/1993 | Yamashita et al. ............ 180/253 |
| 5,382,854 | A |   | 1/1995 | Kawamoto et al. |

(Continued)

FOREIGN PATENT DOCUMENTS

| JP | 2012-183946 | 9/2012 |
| JP | 2012-214203 | 11/2012 |

(Continued)

OTHER PUBLICATIONS

European Search Report mailed Apr. 9, 2014 for a corresponding European Patent Application No. 13199650.6.

*Primary Examiner* — Jeffrey J Restifo

(57) ABSTRACT

A device for driving a rear wheel of an electric vehicle is provided. In one embodiment, the rear wheel driving device includes a motor for supplying rotational power, a gear group connected to a rotor of the motor, a final gear connected to the gear group, an output shaft connected to the final gear and rotating, a hub installed on an outer circumferential surface of the output shaft using a nut, a wheel connected to the hub, an axle housing connected to the hub using a hub bearing, a motor cover protecting the motor and mounting an output shaft bearing, and a trailing arm connected to the axle housing using an axle housing bolt and configured to mount the motor from an exterior side to an interior side of a vehicle.

20 Claims, 8 Drawing Sheets

(56) References Cited

U.S. PATENT DOCUMENTS

| | | | |
|---|---|---|---|
| 5,472,059 A * | 12/1995 | Schlosser et al. | 180/65.51 |
| 5,633,544 A * | 5/1997 | Toida et al. | 310/67 R |
| 5,691,584 A * | 11/1997 | Toida et al. | 310/67 R |
| 5,924,506 A * | 7/1999 | Perego | 180/65.51 |
| 6,328,123 B1 * | 12/2001 | Niemann et al. | 180/65.51 |
| 6,386,553 B2 * | 5/2002 | Zetterstrom | 280/5.51 |
| 6,540,632 B1 * | 4/2003 | Wendl et al. | 475/5 |
| 6,974,399 B2 * | 12/2005 | Lo | 475/5 |
| 7,350,605 B2 * | 4/2008 | Mizutani et al. | 180/65.51 |
| 7,537,071 B2 * | 5/2009 | Kamiya | 180/65.51 |
| 7,641,010 B2 * | 1/2010 | Mizutani et al. | 180/65.51 |
| 7,789,178 B2 * | 9/2010 | Mizutani et al. | 180/65.51 |
| 7,938,211 B2 * | 5/2011 | Yoshino et al. | 180/65.51 |
| 8,002,060 B2 * | 8/2011 | Komatsu | 180/65.51 |
| 8,245,804 B2 * | 8/2012 | van Rooij | 180/65.51 |
| 8,540,041 B2 * | 9/2013 | Su et al. | 180/65.51 |
| 8,581,457 B2 * | 11/2013 | Takahashi et al. | 310/67 R |
| 8,596,395 B2 * | 12/2013 | Hirano | 180/65.51 |
| 8,733,483 B2 * | 5/2014 | Yamamoto et al. | 180/65.51 |
| 8,863,874 B2 * | 10/2014 | Lee | 180/65.51 |
| 2008/0035399 A1 | 2/2008 | Murata et al. | |
| 2009/0100965 A1* | 4/2009 | Sanji et al. | 74/606 R |
| 2009/0101425 A1* | 4/2009 | Laurent | 180/65.51 |
| 2009/0133944 A1* | 5/2009 | Nishioka et al. | 180/65.51 |
| 2011/0115343 A1* | 5/2011 | Walser et al. | 310/67 R |
| 2012/0292978 A1 | 11/2012 | Buschjohann et al. | |
| 2013/0342056 A1 | 12/2013 | Suzuki et al. | |

FOREIGN PATENT DOCUMENTS

| | | |
|---|---|---|
| KR | 10-2008-0087473 | 10/2008 |
| KR | 10-2012-0022168 | 3/2012 |
| WO | WO 2010-101914 | 9/2010 |

* cited by examiner

DEVICE FOR DRIVING REAR WHEEL OF ELECTRIC VEHICLE

CROSS-REFERENCE TO RELATED APPLICATION

This application claims priority to and the benefit of Korean Patent Application No. 10-2013-0073299 filed on Jun. 25, 2013, which is herein incorporated by reference in its entirety.

BACKGROUND OF THE INVENTION

1. Field of the Invention

Aspects of the present invention relate to a device for driving a rear wheel of an electric vehicle, which can assemble a motor from the exterior side to the interior side of a vehicle, can simplify a structure of a trailing arm by providing a fastening part having a large outer diameter at a wheel side, can reduce the load of a motor cover by fastening the motor cover to the inside of the trailing arm and fastening an axle housing to the outside of the trailing arm, and can improve packaging performance by assembling a final gear and a tone wheel on a rear surface of a wheel while nut-fastening an output shaft on a front surface of the wheel, which is a dead space.

2. Description of the Related Art

As fossil fuels, such as petroleum or diesel, are running out, instead of fossil fuel-powered vehicles, development of electric vehicles using electric energy stored in batteries in driving a motor is being actively conducted.

Electric vehicles are classified into a true electric vehicle which drives a motor using only electric energy stored in a rechargeable battery, a solar cell vehicle which drives a motor using photovoltaic energy, a fuel cell vehicle which drives a motor using a hydrogen fuel cell, a hybrid vehicle which drives an engine using fossil fuel while driving a motor using electricity, and the like.

In general, a device for driving a rear wheel of an electric vehicle is configured such that a motor is integrated into a trailing arm, components of a motor, such as a rotor or a stator, are assembled from the inside to the outside of a vehicle body and are protected by a motor cover, and a spring is positioned on a side surface of a motor housing to avoid interference of the motor cover, as disclosed in "Drive device for driving a wheel for an electrically powered vehicle", PCT publication No. WO 2012/123175 (Publication date: Sep. 20, 2012.

However, in the conventional rear wheel driving device of an electric vehicle, since the motor is assembled from a rear surface of the vehicle, it is quite difficult to install the components of the motor on the rear surface. As an alternative option, the components of the motor are limitedly installed on side surfaces of the motor.

In addition, in the conventional rear wheel driving device of an electric vehicle, a motor fastening part is positioned inside a wheel, and a speed reducer fastening part is positioned outside the wheel, making a trailing arm have a complex structure.

SUMMARY OF THE INVENTION

Aspects of the present invention provide a device for driving a rear wheel of an electric vehicle is provided, which can assemble a motor from the exterior side to the interior side of a vehicle and can simplify a structure of a trailing arm by providing a fastening part having a large outer diameter at a wheel side.

Other aspects of the present invention provide a device for driving a rear wheel of an electric vehicle is provided, which can reduce the load of a motor cover by fastening the motor cover to the inside of the trailing arm and fastening an axle housing to the outside of the trailing arm and can improve packaging performance by assembling a final gear and a tone wheel on a rear surface of a wheel while nut-fastening an output shaft on a front surface of the wheel, which is a dead space.

In accordance with one aspect of the present invention, there is provided a device for driving a rear wheel of an electric vehicle, the rear wheel driving device including a motor for supplying rotational power, a gear group connected to a rotor of the motor, a final gear connected to the gear group, an output shaft connected to the final gear and rotating, a hub installed on an outer circumferential surface of the output shaft using a nut, a wheel connected to the hub, an axle housing connected to the hub using a hub bearing, a motor cover protecting the motor and mounting an output shaft bearing, and a trailing arm connected to the axle housing using an axle housing bolt and configured to mount the motor from an exterior side to an interior side of a vehicle.

The rear wheel driving device may further include a tone wheel press-fit into an outer diameter of the final gear and sensing the speed of a wheel.

The output shaft bearing may be installed on a rear surface of the output shaft and may prevent the output shaft from being bent.

The rear wheel driving device may further include a reference pin for maintaining concentricity of a reduction gear shaft and a motor shaft by aligning the axle housing.

The rear wheel driving device may further include a caliper fastened to the axle housing and braking rotation of a disk using a hydraulic pressure.

The gear group may include an input gear connected to a rotor of the motor, a reduction gear connected to the input gear, and an output gear connected to the reduction gear.

The center of the rotor of the motor and the output shaft as a wheel shaft may be eccentrically disposed.

The trailing arm may be connected to the axle housing to the exterior side of the vehicle using an axle housing bolt.

The trailing arm may be configured such that a motor housing is integrally formed with the trailing arm to mount the motor from the exterior side to the interior side of the vehicle and a spring housing is integrally formed with the motor housing on a rear surface of the motor housing.

The motor may include a stator as a fixed member and a rotor as a rotating member, the stator being press-fitted into the motor housing of the trailing arm, and the rotor being supported by the motor cover installed on its front surface and the motor housing installed on its rear surface.

The motor cover may protect the motor and performs a function of mounting an output shaft bearing to reduce the weight, and the motor cover may have a smaller outer diameter than the motor housing of the trailing arm so as to be completely buried in the trailing arm and may then be assembled with the trailing arm using a motor cover bolt.

The reference pin may maintain the concentricity of the reduction gear shaft and the motor shaft by aligning the axle housing on the basis of the motor cover.

The tone wheel may be an annular body having teeth spaced a constant distance apart from each other and press-fitted into the outer diameter of the final gear, and may sense a rotation speed of the wheel using a wheel speed sensor positioned in vicinity of the tone wheel.

As described above, in the device for driving a rear wheel of an electric vehicle according to the present invention, a motor can be assembled from the exterior side to the interior side of a vehicle and a structure of a trailing arm can be simplified by providing a fastening part having a large outer diameter at a wheel side. In addition, the load of a motor cover can be reduced by fastening the motor cover to the inside of the trailing arm and fastening an axle housing to the outside of the trailing arm. Further, packaging performance can be improved by assembling a final gear and a tone wheel on a rear surface of a wheel while nut-fastening an output shaft on a front surface of the wheel.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings in such a manner that the technical idea of the present disclosure may easily be carried out by a person with ordinary skill in the art to which the invention pertains. Objects, operations, effects, other objects, characteristics and advantages of the present disclosure will be easily understood from an explanation of a preferred embodiment that will be described in detail below by reference to the attached drawings.

Although embodiments have been described with reference to illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Figure 1:
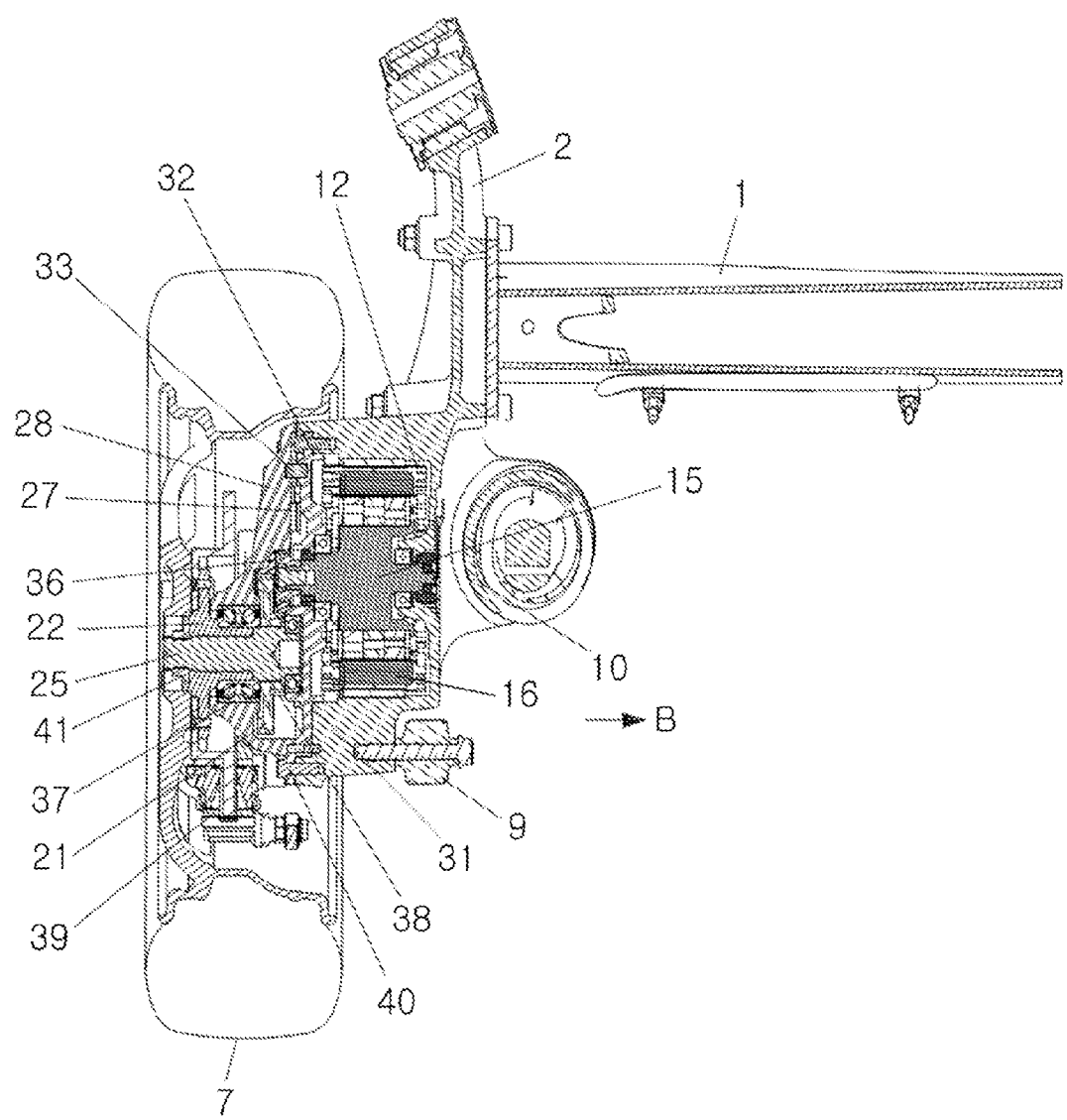
FIG. 1 is a cross-sectional view of a device for driving a rear wheel of an electric vehicle according to an embodiment of the present invention.
Figure 2:
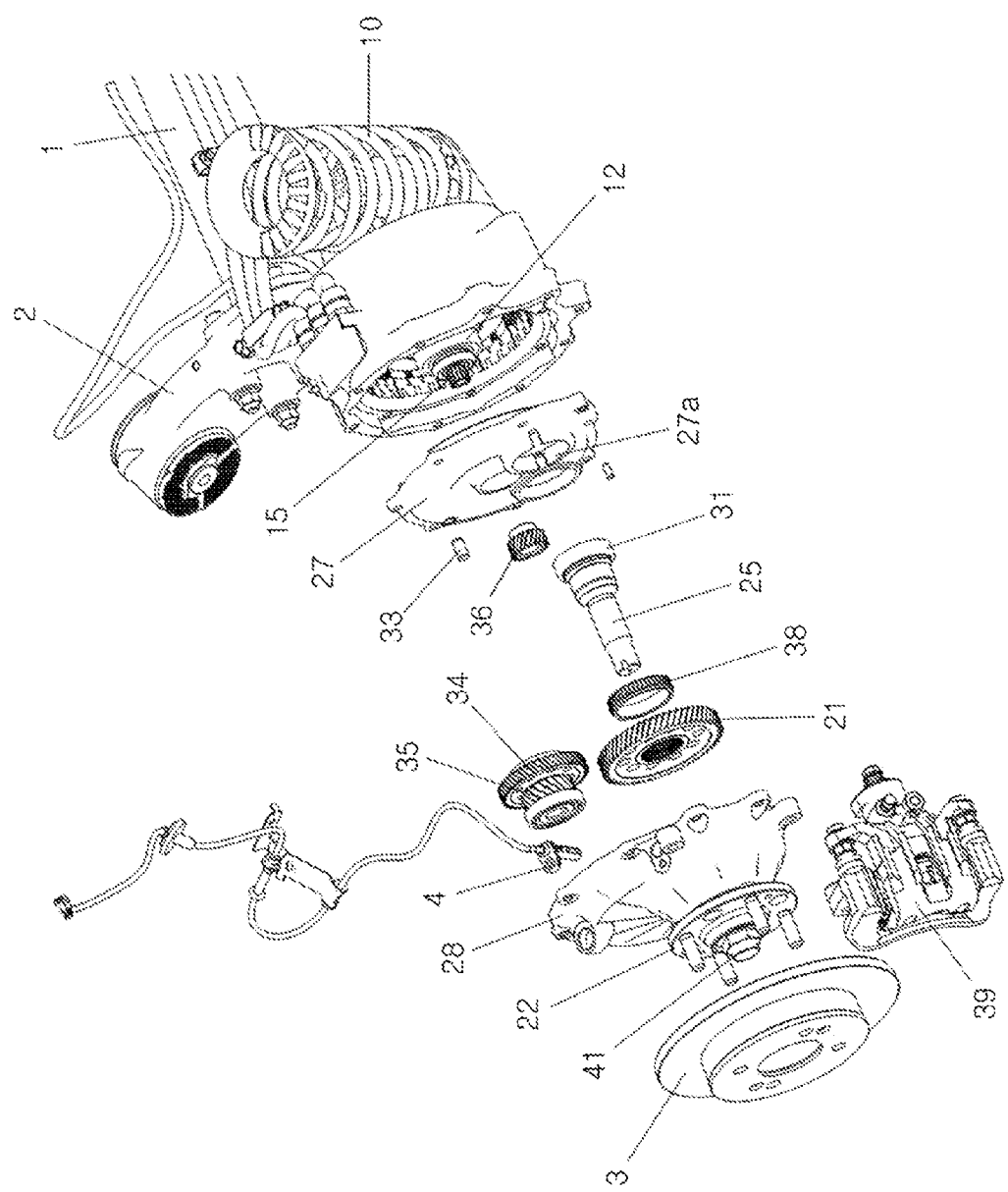
FIG. 2 is an exploded perspective view of the rear wheel driving device shown in FIG. 1.
Figure 3:
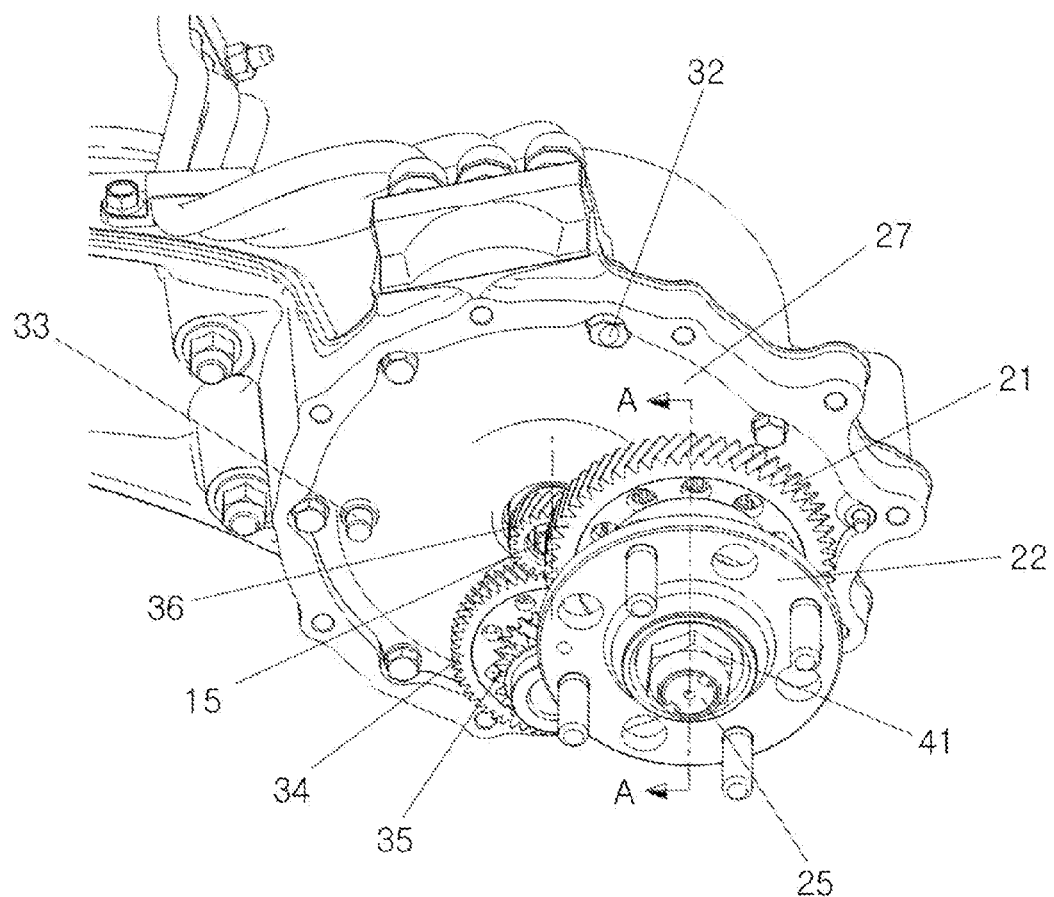
FIG. 3 is a partially exploded perspective view illustrating an assembled state of the rear wheel driving device shown in FIG. 1.
Figure 4:
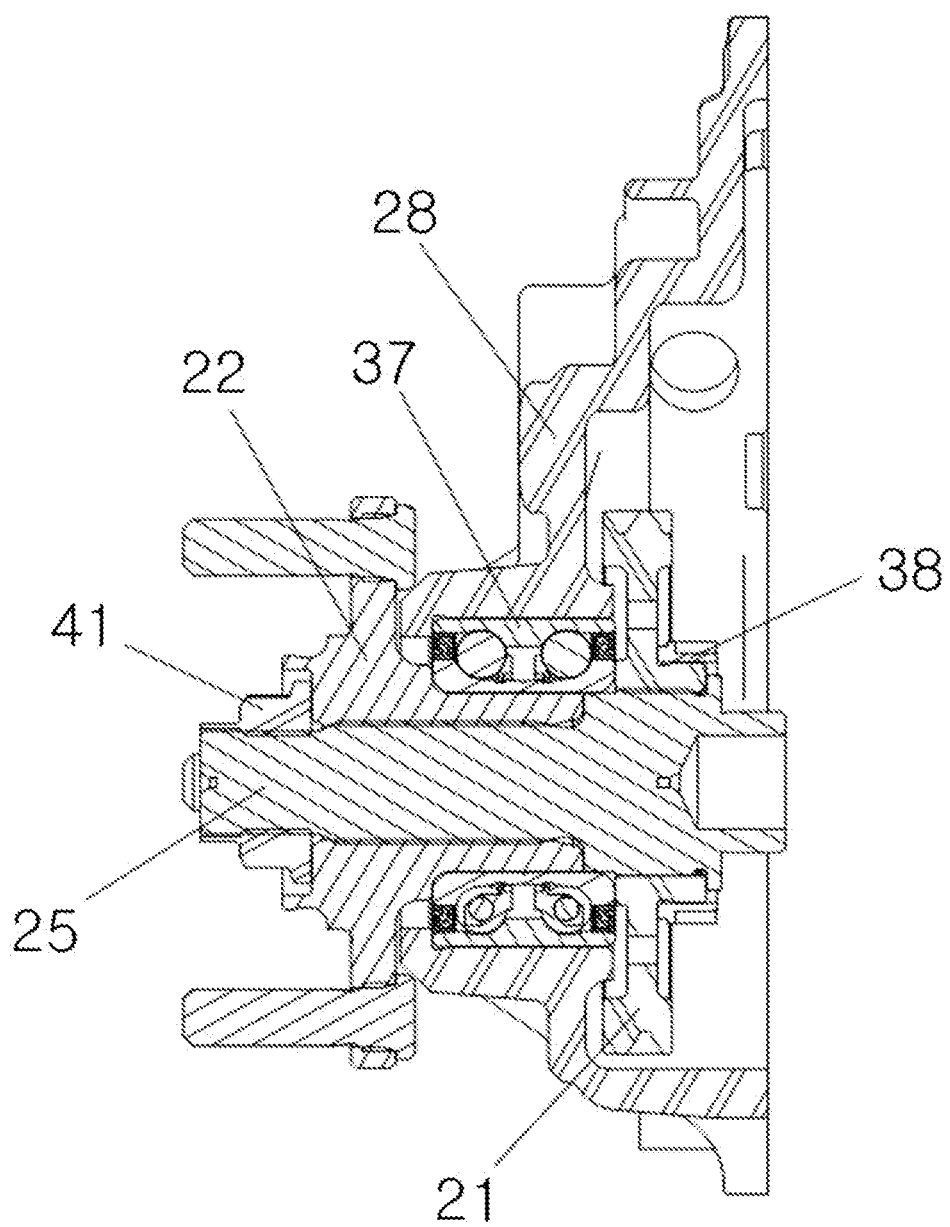
FIG. 4 is a cross-sectional view taken along the line A-A of FIG. 3.

FIG. 1 is a cross-sectional view of a device for driving a rear wheel of an electric vehicle according to an embodiment of the present invention, FIG. 2 is an exploded perspective view of the rear wheel driving device shown in FIG. 1, FIG. 3 is a partially exploded perspective view illustrating an assembled state of the rear wheel driving device shown in FIG. 1, and FIG. 4 is a cross-sectional view taken along the line A-A of FIG. 3.

As shown in FIGS. 1 to 4, the device for driving a rear wheel of an electric vehicle according to an embodiment of the present invention includes a motor 12 for supplying rotational power, an input gear 36 connected to a rotor 15 of the motor 12, a reduction gear 34 connected to the input gear 36, an output gear 35 connected to the reduction gear 34, a final gear 21 connected to the output gear 35, a tone wheel 38 press-fit into an outer diameter of the final gear 21 and sensing the speed of a wheel, an output shaft 25 connected to the final gear 21 and rotating, an output shaft bearing 31 installed on a rear surface of the output shaft 25 and preventing the output shaft 25 from being bent, a hub 22 installed on an outer circumferential surface of the output shaft 25 using a nut 41, a wheel 7 connected to the hub 22, an axle housing 28 connected to the hub 22 using a hub bearing 37, a motor cover 27 protecting the motor 12 and mounting the output shaft bearing 31, a reference pin 33 for maintaining concentricity of a reduction gear shaft and a motor shaft by aligning the axle housing 28, a trailing arm 2 connected to the axle housing 28 using an axle housing bolt 40 and mounting the motor 12 in a direction (B) ranging from the exterior side to the interior side from of the vehicle, a torsion beam 1 connected to the trailing arm 2, a caliper 39 fastened to the axle housing 28 and braking rotation of a disk 3 using a hydraulic pressure, a damper 9 mounted on the trailing arm 2 and gradually reducing vibrations generated on a road surface, and a spring 10 mounted in the trailing arm 2 and preventing the vibrations generated on the road surface from being directly transferred to the vehicle body.

The motor 12 includes a stator 16 as a fixed member and a rotor 15 as a rotating member. The stator 16 is press-fitted into the motor housing 2a of the trailing arm 2, and the rotor 15 is installed inside the stator 16 so as to be rotatably supported by the motor cover 27 installed on its front surface and the motor housing 2a installed on its rear surface.

The center of the rotor 15 of the motor 12 and the output shaft 25 as a wheel shaft are eccentrically disposed.

The output shaft 25 is fastened on the front surface of the wheel by the nut 41, thereby assembling the final gear 21 and the tone wheel 38 on the rear surface of the output shaft 25.

The output shaft bearing 31 is installed on the rear surface of the output shaft 25 and prevents the output shaft 25 from being bent due to a force transferred from the final gear 21.

The hub bearing 37 is mounted on the outer circumferential surface of the hub 22 connected to the output shaft 25 and directly undergoes the load of the vehicle.

The axle housing 28 is aligned by the reference pin 33 and fixed to the trailing arm 2 using the axle housing bolt 40. The axle housing 28 supports the hub bearing 37 and the reduction gear shaft and protects the inside of the gears.

The reduction gear shaft is supported to the axle housing 28 from the exterior side of the wheel and is supported to the motor cover 27 from the interior side of the wheel, and the reference pin 33 is preferably positioned such that the axle housing 28 and the motor cover 27 are aligned. However, the axle housing 28 directly undergoing the load is fastened and fixed to the trailing arm 2, thereby providing improved durability.

Figure 5:
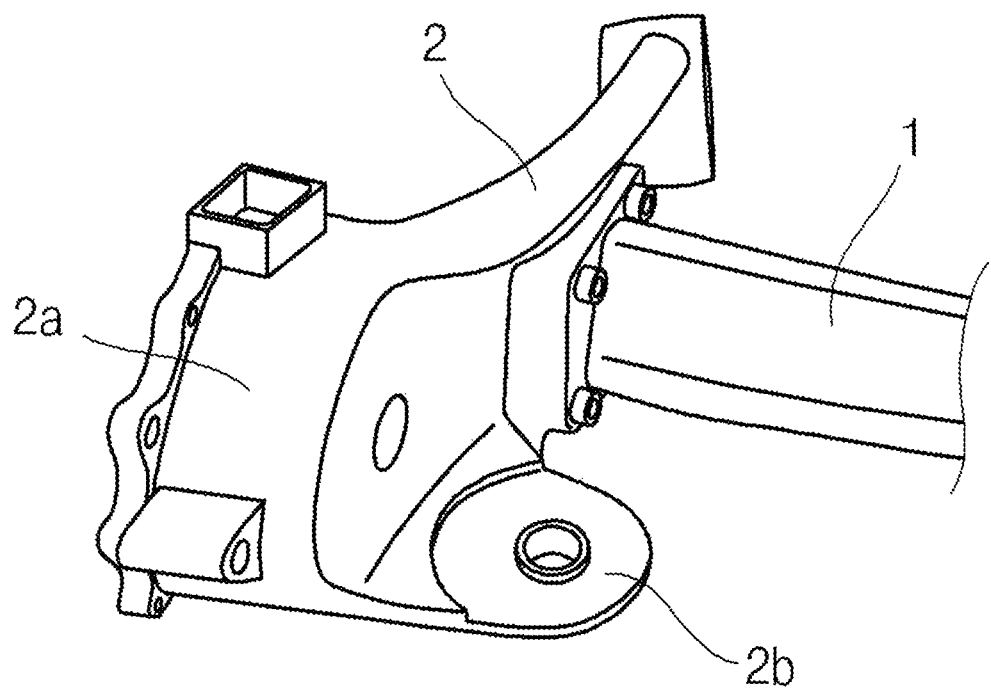
FIG. 5 is a schematic view of a trailing arm of the rear wheel driving device shown in FIG. 1.
Figure 6:
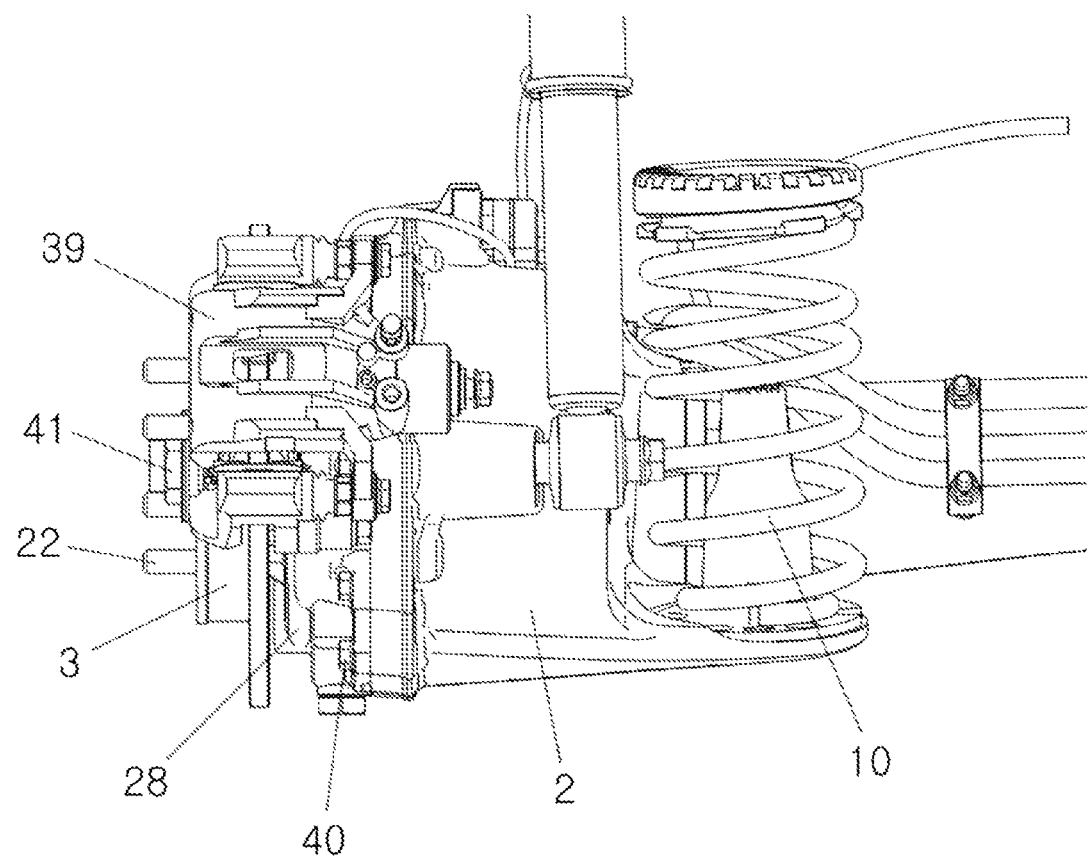
FIG. 6 is a view illustrating a state in which a spring is installed in the trailing arm of the rear wheel driving device shown in FIG. 1.

FIG. 5 is a schematic view of a trailing arm of the rear wheel driving device shown in FIG. 1 and FIG. 6 is a view illustrating a state in which a spring is installed in the trailing arm of the rear wheel driving device shown in FIG. 1.

The trailing arm 2 is supported to the left and right sides of the torsion beam 1 and supports left and right wheels 7 of the vehicle using torsion deformation of the torsion beam 1.

The trailing arm 2 is integrally formed with a motor housing 2a to mount the motor 12 in a direction (B) ranging from the exterior side to the interior side of the vehicle, and a spring housing 2b is integrally formed with the motor housing 2a on a rear surface of the motor housing 2a.

The trailing arm 2 is configured such that the motor cover 27 is buried therein and fastened thereto and the axle housing 28 is fastened to the exterior side thereof using the axle housing bolt 40.

According to the present invention, the motor 12 is assembled in the direction (B) ranging from the exterior side to the interior side of the vehicle, and the spring 10 is positioned on the rear surface of the motor housing 2a of the trailing arm 2, thereby supporting the spring 10 undergoing a heavy load with an increased area.

In addition, since an opening of the motor housing 2a of the trailing arm 2 is formed to face the wheel side, rather than the inside of the vehicle, the trailing arm 2 may have a simplified structure.

Figure 7:
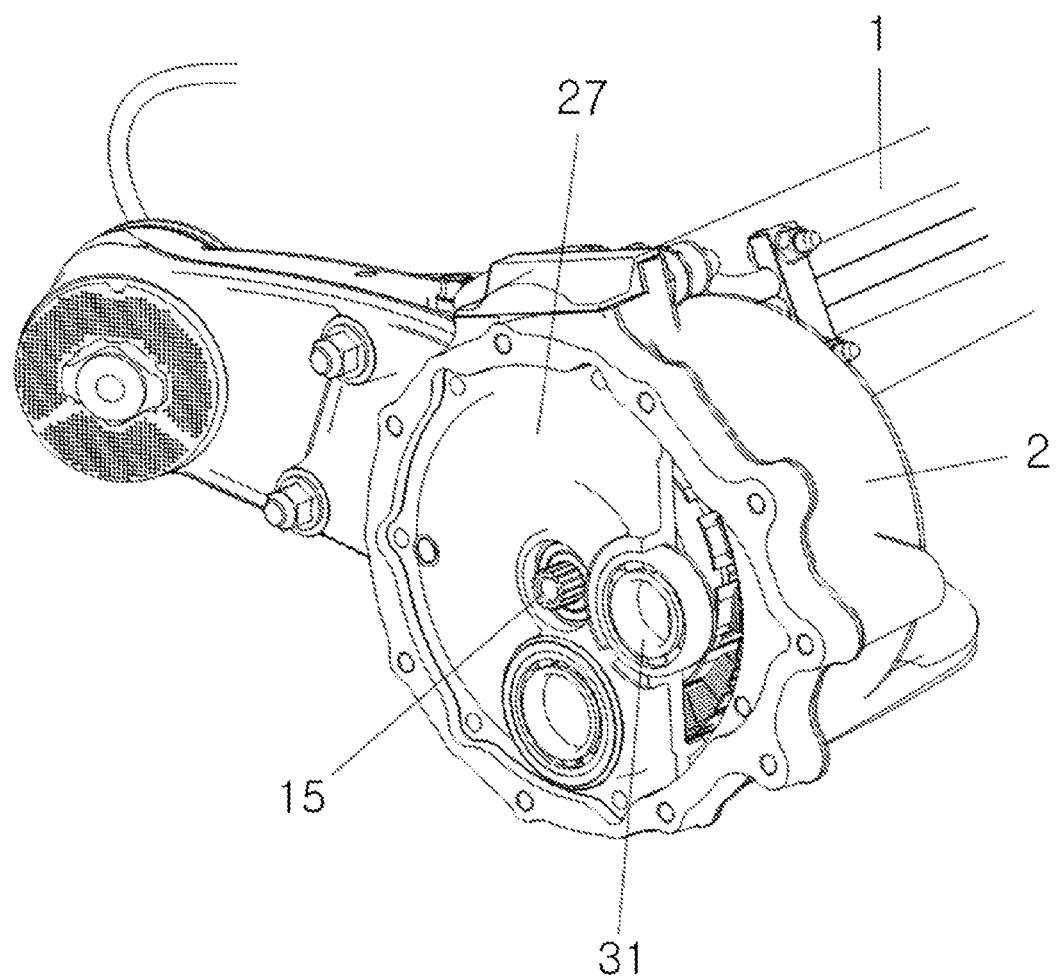
FIG. 7 is a view illustrating a state in which a motor cover is installed in the rear wheel driving device shown in FIG. 1.

FIG. 7 is a view illustrating a state in which a motor cover is installed in the rear wheel driving device shown in FIG. 1.

Since the motor cover 27 protects the motor 12 and performs a function of mounting the output shaft bearing 31, it can be fabricated with a compact structure, thereby reducing the weight. The motor cover 27 has a smaller outer diameter than the motor housing 2a of the trailing arm 2 to be completely buried in the trailing arm 2 and then assembled with the trailing arm 2 using a motor cover bolt 32, thereby protecting the motor 12. An output shaft bearing mounting part 27a is formed in the motor cover 27, so that the output shaft bearing 31 is mounted on an output shaft bearing mounting part 27a, thereby preventing the output shaft 25 from being bent.

The reference pin 33 aligns the axle housing 28 on the basis of the motor cover 27, differently from a fastening location of the axle housing 28, thereby maintaining the concentricity of the reduction gear shaft and the motor shaft.

Figure 8:
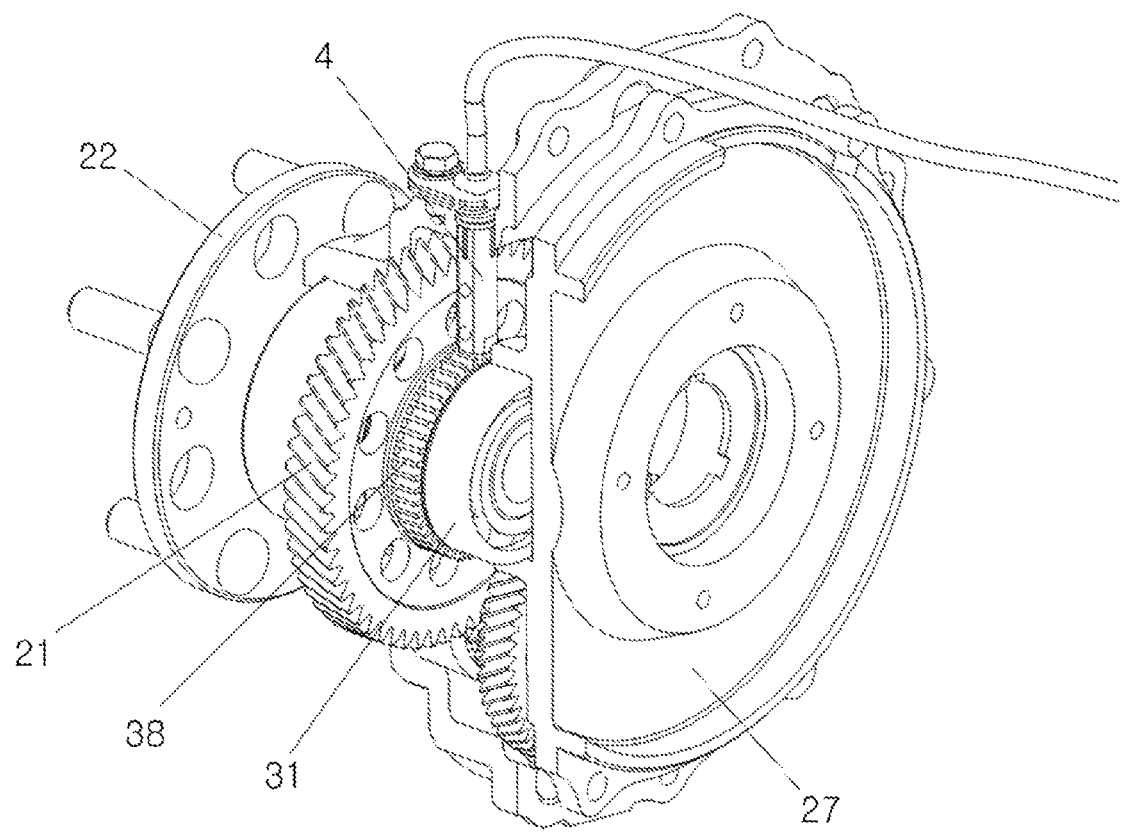
FIG. 8 is a view illustrating a state in which a tone wheel is installed in the rear wheel driving device shown in FIG. 1.

FIG. 8 is a view illustrating a state in which a tone wheel is installed in the rear wheel driving device shown in FIG. 1.

The tone wheel 38 is an annular body having teeth spaced a constant distance apart from each other and is press-fitted into the outer diameter of the final gear 21. In addition, the tone wheel 38 senses a rotation speed of the wheel by interacting with a wheel speed sensor 4 positioned in vicinity of the tone wheel 38.

With this configuration, the rear wheel driving device operates as follows.

If rotational power is generated from the motor 12, it is transferred to the input gear 36 connected to the rotor 15 of the motor 12. The rotational power transferred to the input gear 36 is primarily decelerated by the reduction gear 34 having a larger diameter than the input gear 36.

The rotational power transferred to the input gear 36 is transferred to the output gear 35 fixedly connected to the reduction gear 34, the output gear 35 having a relatively small diameter, and the rotational power transferred to the output gear 35 is secondarily decelerated in a state in which the output gear 35 circumscribes around the final gear 21 having a relatively large diameter.

The final gear 21 transfers the rotational power to the output shaft 25, and the rotational power transferred to the output shaft 25 is then transferred to the hub 22, thereby rotating the wheel 7.

Since the tone wheel 38 is press-fitted into the outer diameter of the final gear 21 toward the inside of the vehicle, the wheel speed sensor 4 attached to the axle housing 28 accurately senses the rotation speed of the wheel 7 using the tone wheel 38.

Although the device for driving rear wheel of electric vehicle according to an exemplary embodiment of the present invention has been described in detail hereinabove, it should be understood that many variations and modifications of the basic inventive concept herein described, which may appear to those skilled in the art, will still fall within the spirit and scope of the exemplary embodiments of the present invention as defined by the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A device for driving a rear wheel of an electric vehicle, the device comprising:
    a motor for supplying rotational power;
    a gear group connected to a rotor of the motor;
    a final gear connected to the gear group;
    an output shaft connected to the final gear and rotating;
    a hub installed on an outer circumferential surface of the output shaft using a nut;
    a wheel connected to the hub;
    an axle housing connected to the hub using a hub bearing;
    a motor cover protecting the motor and mounting an output shaft bearing; and
    a trailing arm connected to the axle housing an axle housing bolt and configured to mount the motor from an exterior side to an interior side of a vehicle, wherein the trailing arm is configured such that a motor housing is integrally formed with the trailing arm to mount the motor from the exterior side to the interior side of the vehicle.

2. The rear wheel driving device of claim 1, further comprising a tone wheel press-fit into an outer diameter of the final gear and sensing the speed of a wheel.

3. The rear wheel driving device of claim 2, wherein the trailing arm is configured such that a spring housing is integrally formed with the motor housing on a rear surface of the motor housing.

4. The rear wheel driving device of claim 1, wherein the output shaft bearing is installed on a rear surface of the output shaft and prevents the output shaft from being bent.

5. The rear wheel driving device of claim 4, wherein the trailing arm is configured such that a spring housing is integrally formed with the motor housing on a rear surface of the motor housing.

6. The rear wheel driving device of claim 1, further comprising a caliper fastened to the axle housing and braking rotation of a disk using a hydraulic pressure.

7. The rear wheel driving device of claim 1, wherein the gear group includes an input gear connected to a rotor of the motor, a reduction gear connected to the input gear, and an output gear connected to the reduction gear.

8. The rear wheel driving device of claim 1, wherein the center of the rotor of the motor and the output shaft as a wheel shaft are eccentrically disposed.

9. The rear wheel driving device of claim 1, wherein the trailing arm is connected to the axle housing to the exterior side of the vehicle using an axle housing bolt.

10. The rear wheel driving device of claim 1, wherein the trailing arm is configured such that a spring housing is integrally formed with the motor housing on a rear surface of the motor housing.

11. The rear wheel driving device of claim 10, wherein the gear group includes an input gear connected to a rotor of the motor, a reduction gear connected to the input gear, and an output gear connected to the reduction gear.

12. The rear wheel driving device of claim 10, wherein the center of the rotor of the motor and the output shaft as a wheel shaft are eccentrically disposed.

13. The rear wheel driving device of claim 10, wherein the trailing arm is connected to the axle housing to the exterior side of the vehicle using an axle housing bolt.

14. The rear wheel driving device of claim 10, wherein the tone wheel is an annular body having teeth spaced a constant distance apart from each other and press-fitted into the outer diameter of the final gear, and senses a rotation speed of the wheel using a wheel speed sensor positioned in vicinity of the tone wheel.

15. The rear wheel driving device of claim 10, wherein a circumferential region of the trailing arm to be assembled with the motor cover has smaller diameter than a circumferential region of the trailing arm to be connected to the axle housing and is buried in the trailing arm, so that the motor cover and the axle housing is connected to the trailing arm separately.

16. The rear wheel driving device of claim 1, wherein the motor includes a stator as a fixed member and a rotor as a rotating member, the stator being press-fitted into the motor housing of the trailing arm, and the rotor being supported by the motor cover installed on its front surface and the motor housing installed on its rear surface.

17. The rear wheel driving device of claim 1, wherein the motor cover protects the motor and performs a function of mounting an output shaft bearing to reduce the weight, and the motor cover has a smaller outer diameter than the motor housing of the trailing arm so as to be completely buried in the trailing arm and is then assembled with the trailing arm using a motor cover bolt.

18. The rear wheel driving device of claim 1, further comprising a reference pin, wherein the reference pin maintains the concentricity of the reduction gear shaft and the motor shaft by aligning the axle housing on the basis of the motor cover.

19. The rear wheel driving device of claim 1, wherein the tone wheel is an annular body having teeth spaced a constant distance apart from each other and press-fitted into the outer diameter of the final gear, and senses a rotation speed of the wheel using a wheel speed sensor positioned in vicinity of the tone wheel.

20. The rear wheel driving device of claim 1, wherein a circumferential region of the trailing arm to be assembled with the motor cover has smaller diameter than a circumferential region of the trailing arm to be connected to the axle housing and is buried in the trailing arm, so that the motor cover and the axle housing is connected to the trailing arm separately.

* * * * *